United States Patent
Johnson et al.

(10) Patent No.: US 9,047,556 B2
(45) Date of Patent: Jun. 2, 2015

(54) MEDIA DETERMINATION FOR A PRINT JOB FROM A RASTERIZATION PROCESS

(75) Inventors: Charles D. Johnson, Boulder, CO (US); Lisa A. Morgan, Blackfoot, ID (US); Kenneth S. Shouldice, Firestone, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/407,504

(22) Filed: Feb. 28, 2012

(65) Prior Publication Data

US 2013/0222819 A1    Aug. 29, 2013

(51) Int. Cl.
| | |
|---|---|
| H04N 1/00 | (2006.01) |
| G06K 15/00 | (2006.01) |
| G06K 15/02 | (2006.01) |
| G06F 3/12 | (2006.01) |
| G06K 9/34 | (2006.01) |
| G06K 9/36 | (2006.01) |
| G06F 3/00 | (2006.01) |

(52) U.S. Cl.
CPC .......... G06K 15/402 (2013.01); G06K 15/1823 (2013.01); G06K 15/4065 (2013.01)

(58) Field of Classification Search
CPC ........... G06K 15/00; G06K 15/02; G06F 3/12
See application file for complete search history.

(56) References Cited

U.S. PATENT DOCUMENTS

| | | | | |
|---|---|---|---|---|
| 5,289,236 | A | * | 2/1994 | Yoshino ........................ 399/86 |
| 6,401,141 | B1 | * | 6/2002 | Kumler ......................... 710/10 |
| 6,917,437 | B1 | * | 7/2005 | Myers et al. ................. 358/1.15 |
| 2002/0097408 | A1 | * | 7/2002 | Chang et al. .................. 358/1.6 |
| 2007/0236725 | A1 | | 10/2007 | Harmon et al. |
| 2008/0080003 | A1 | * | 4/2008 | Ferlitsch et al. ............. 358/1.16 |
| 2008/0180742 | A1 | * | 7/2008 | Koike ......................... 358/1.15 |

* cited by examiner

*Primary Examiner* — Fred Guillermety
*Assistant Examiner* — Henok A Shiferaw
(74) *Attorney, Agent, or Firm* — Duft Bornsen & Fettig LLP

(57) ABSTRACT

Methods and systems herein provide for identifying multiple types of media that will be used for print a print job by rasterizing raw print data for the print job. In one embodiment, a print controller receives a print job. The print controller identifies multiple types of media that will be utilized for printing the print job by rasterizing raw print data of the print job. The print controller generates a list of printable media that will be utilized for printing the job based on the multiple types of media that are identified. The print controller then provides the list of printable media to a print operator.

20 Claims, 4 Drawing Sheets

MEDIA DETERMINATION FOR A PRINT JOB FROM A RASTERIZATION PROCESS

FIELD OF THE INVENTION

The invention relates to the field of printing systems, and in particular, to determining media for printing a job.

BACKGROUND

Printers generally include a print controller that receives print jobs, and a print engine. Print jobs include raw print data (e.g., Page Description Language (PDL) data), and a job ticket. Job tickets are often used to specify output characteristics for the job, such as the type of media to use when printing the job, the number of logical pages on a side of media (also referred to as a sheet side), stapling instructions, duplexing instructions, etc. When receiving a job, the printer may not print the job immediately. Instead, the job may be written to a job spool and held until the job is rasterized. The print controller may de-spool the raw print data, and rasterize the raw print data into bitmap data. Bitmap data may then be written to a rip spool, such as when multiple copies of the job are to be printed and/or the job is too complex to rasterize the job fast enough to provide the print engine with bitmap data at the rated speed of the print engine. A job spool and/or a rip spool may be stored by one or more hard disk drives, flash drives, or other types of non-volatile storage systems. The print engine utilizes the bitmap data to mark a printable media, such as paper.

In some cases, a print operator may lack information about what media to load at the printer in order to print the job. This may reduce the efficiency of the printing process as the print operator is tasked with loading media at the printer during printing. It therefore remains a problem to determine the media requirements for a job when media information for printing a job is missing or incomplete.

SUMMARY

Embodiments described herein provide for identifying multiple types of media that will be used for printing a print job by rasterizing raw print data for the print job. As print data for the job is rasterized by a print controller of a printer, different types of media for printing the job are identified from the print data. The different types of media are assembled by the print controller into a list of printable media that will be used for printing the print job. The list of printable media is provided to a print operator. The list may then be used by the print operator to determine all the printable media used to print the job prior to printing the job.

One embodiment comprises a system. The system includes a control system of a print controller and a rasterizer of the print controller. The control system receives a print job. The rasterizer identifies multiple types of media that will be utilized for printing the print job by rasterizing raw print data of the print job. The rasterizer indicates the multiple types of media to the control system. The control system generates a list of printable media that will be utilized for printing the job based on the multiple types of media identified by the rasterizer. The control system then provides the list of printable media to a print operator.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
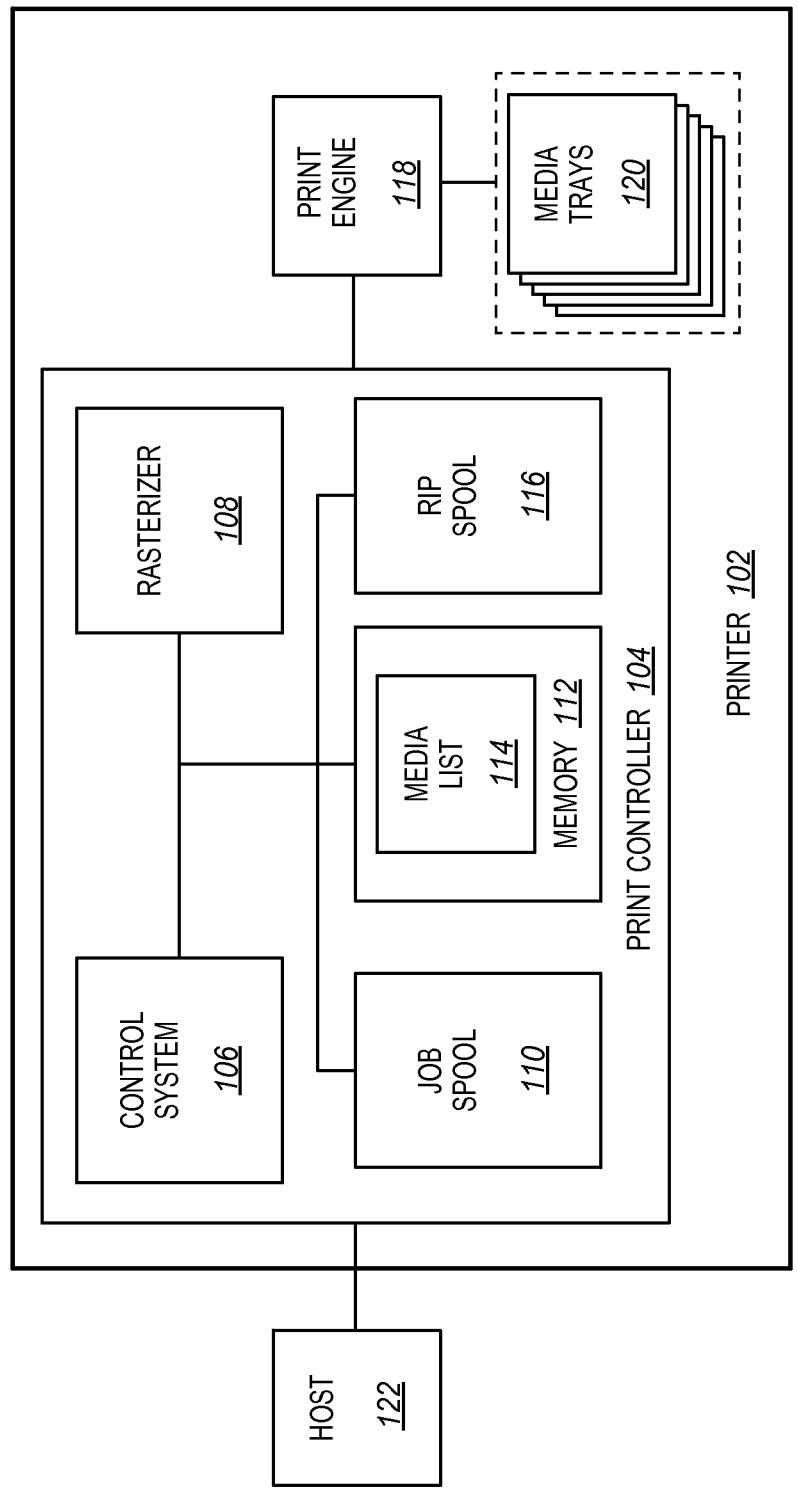
FIG. 1 is a block diagram of a printer in an exemplary embodiment.

FIG. 1 is a block diagram of a printer 102 in an exemplary embodiment. Printer 102 includes a print controller 104, a print engine 118, and one or more media trays 120. In printer 102, controller 104 receives a print job from host 122 for imprinting onto a printable media, such as paper. Print jobs typically include "raw" print data in a page description language (PDL) such as Printer Control Language (PCL), PostScript data, etc. Print jobs may also include a job ticket that defines various characteristics of the print job, such as the type of media to use when printing the job (e.g., size, weight, color, etc.), the number of logical pages per sheet side, which media trays at the printer to pull media from when printing the job, etc. One common format for job tickets is Job Definition Format (JDF), which utilizes Extensible Markup Language (XML) to specify information in the job ticket. Typically, a print job that is received by printer 102 is written to a job spool 110.

After the job is rasterized and prior to printing a job, print controller 104 may analyze the media list (described later) associated with a job to determine if media trays 120 are loaded with the media for printing the job. When media trays 120 are not loaded with the proper media for printing the job, the print job may be flagged as ineligible for printing, and an operator may be instructed to load one or more media trays 120 based on the information in the PDL or job ticket with the correct media prior to releasing the job for printing. Print controller 104 may also analyze the job ticket to determine if the print job may have to be ripped in its entirety before printing the job. For example, some jobs include out of order pages, have a booklet format, etc. As such, the logical page order in the print job does not necessarily correspond to the printed order. Thus, the job may be ripped and spooled prior to printing so as to place the bitmap images in the correct order for the printing process.

In prior printers, the media for the job is not determined until the print job is released for printing. In this case, the media for the job is determined during the printing process as each page of the job is rasterized. As each page of the print job is rasterized, the PDL is analyzed to determine the correct media for a particular page. This may cause problems when the PDL in the raw print data specifies media that is not loaded at the printer. When the rasterizer reaches a page in the job that specifies media that is not loaded at the printer, the printing process stops and the print operator is instructed to load the correct media. This may generate a significant amount of operator interaction in order to print the job. For example, the PDL in a print job may specify A4, letter, and legal paper for different logical pages or sheet sides for the job. While a printer may have three physical media trays, the trays may not be loaded with the media used for printing the job. For instance, two trays of the printer may be loaded with letter, and one tray of the printer may be loaded with A4. In this scenario, the print operator may be prompted repeatedly during the printing process to first load legal, and then load A4 as the job is printed because the proper media for the job are determined on a page-by-page basis as the job is rasterized and printed. This renders the printing process on printer 102 less efficient and wastes the time of the print operator.

In this embodiment, print controller 104 generates a media list 114 (stored by memory 112) for jobs based on information obtained during the rasterization process. As a job is rasterized and written to rip spool 116, print controller 104 identifies the different types of media that will be used to print the job. Print controller 104 then generates a media list 114 of the media for printing the job. Using media list 114, Printer controller 104 may indicate that a job is ineligible for printing when the media required for the job is not currently loaded in media trays 120. Alternatively, if media indicated in media list 114 is already loaded at media trays 120, print controller 104 may automatically initiate printing of the job. Print controller 104 may also provide media list 114 to a print operator, who may review media list 114 to determine how media trays 120 are to be loaded prior to printing the job. This reduces the amount of operator intervention that occurs during the printing process, because media list 114 specifies the media that will be used for printing the job in its entirety. An example of how print controller 104 may operate will be discussed in more detail with regard to the method described in FIG. 2.

Figure 2:
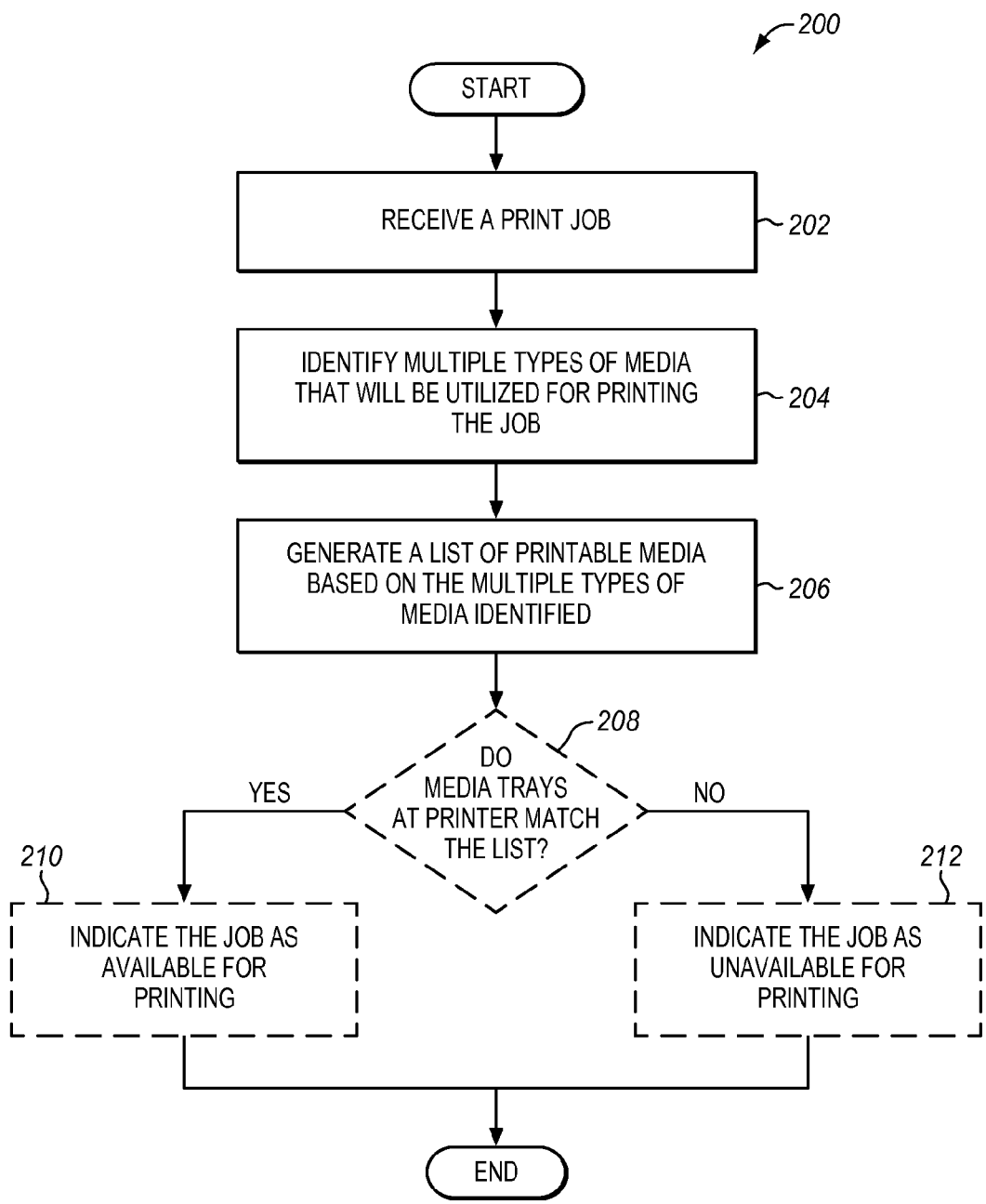
FIG. 2 is flow chart illustrating a method of identifying multiple types of media for a printing job from a rasterization process in an exemplary embodiment.

FIG. 2 is flow chart illustrating a method 200 of determining media for printing a job from a rasterization process in an exemplary embodiment. The steps of method 200 will be described with respect to printer 102 of FIG. 1, although one skilled in the art will understand that method 200 may be performed by other systems not shown. The steps of the methods described herein are not all inclusive and may include other steps not shown. The steps may also be performed in an alternative order.

Assume for this embodiment that host 122 generates a print job for printer 102. In this embodiment, a job ticket for the print job does not specify media for printing the job. The job ticket may fail to specify media for part of the job, the entire job, or some combination of both. In step 202, control system 106 receives the print job from host 122. Control system 106 may then write the print job to job spool 110 to allow the job to be printed at some later time.

In step 204, rasterizer 108 identifies multiple types of media that will be used for printing the job as raw print data of the job is rasterized. In some embodiments, control system 106 may determine a print order of the logical pages in the print job, and initiate the rasterization process in cases where the print order is not sequential. For example, the logical pages in the print job may be for a booklet, such that the logical pages are out of sequence (e.g., the print job may be a sequence of logical page 1, logical page 99, logical page 2, and logical page 98 . . . etc.)

The job may be de-spooled from job spool 110 and processed by rasterizer 108. During the rasterization process, rasterizer 108 processes PDL data to generate bitmap data. The bitmap data may then be written to rip spool 116. As the PDL data is converted into bitmap data by rasterizer 108, the PDL data is analyzed by rasterizer 108 to determine the type of media for printing the job. Determining the type of media for printing the job may be performed on a page-by-page basis during the rasterization process. For example, as each logical page of the print job is rasterized by rasterizer 108, the type of media for printing each of the logical pages may be determined and provided to control system 106.

In cases where the PDL data specifies different media for different parts of the job, rasterizer 108 may output a sequence of media information to control system 106 as each logical page of the print job are rasterized. For example, rasterizer 108 may output . . . A4, A4, letter, A4, A4, A4 . . . to control system 106 as logical pages of the raw print data of the job are analyzed and rasterized. In some cases, rasterizer 108 may not be able to identify a type of media from the PDL data. In this case, rasterizer 108 and/or control system 106 may utilize default types of media at printer 102 for the type(s) of media. The default types may come from a variety of sources. Therefore, the default types of media, PDL media type information, etc., may be prioritized to allow rasterizer 108 and/or controller 106 to select a type of media in a deterministic manner. For example, if the PDL data is missing a type of media for a logical page, then rasterizer 108 and/or control system 106 may consider a hierarchy of different sources for the information. Some sources of the information may include job tickets, PDL data of the print job, default values set at printer 102, virtual printer settings used when generating the print job, default media trays 120 assigned to the job, etc.

When generating raster data for a job, a rasterizer not only considers the PDL data in the print job, but also the size, type, weight, finish, and other properties of the type of media that the job is ultimately printed on. This occurs because a number of factors may affect how the same bitmap data "looks" after being printed onto different media. For example, printing the same bitmap data on a glossy finished paper may look different than printing the bitmap data on a plain finished paper. In order to solve this problem, rasterizers use various properties of the target media type when generating bitmap data for that type of media in order to tailor the bitmap data to the media. Tailoring the bitmap data to the media may include variations in pel (pixel) size and shape, colorant density, etc. Therefore, a rasterizer uses information about the properties of the target media type in order to accurately generate raster data for a job. When properties of the target media type are incompletely known at rasterization time (e.g., a type of media is not loaded at printer 102, or is not completely known by printer 102), then a virtual stored media may be generated that specifies one or more media properties used for rasterizing the job. Rasterizer 108 may then rasterize portions of the job based on the one or more media properties specified in the virtually stored media. By using virtually stored media, printer 102 can continue the rasterization process without an operator intervention. At some later time when the bitmap data for the job is printed, a print operator may be alerted to load media at printer 102 that is based on the media properties captured by the virtually stored media.

In step 206 of FIG. 2, control system 106 generates media list 114 based on the multiple types of media identified by rasterizer 108 in step 204. To generate media list 114, control system 106 may process each of the types of media indicated to control system 106 by rasterizer 108, and determine if the type of media for printing the job is already represented in media list 114. If control system 106 determines that the type of media is not represented in media list 114, control system 106 adds the type of media to media list 114. If control system determines that the type of media is already represented in media list 114, control system 106 may recognize the media as a duplicate type for which no new entry is needed in media list 114. Media list 114 may specify a media for each logical page of the print job, a media for each sheet side of the print job, a media for a group of pages or sheet sides, or some combination of any of the preceding. Media list 114 may also specify all the media required to print the job, such as listing A4, letter, and legal as per the example regardless of how many times A4, letter, and/or legal size media is identified in the print job. In step 208, controller 104 may further compare media list 114 with the media available at media trays 120. Controller 104 may further automatically indicate the job as available for printing and/or print the job if media requirements of media list 114 match the media available at media trays 120, as indicated in step 210. Alternatively, controller 104 may indicate the job as unavailable for printing in step 212 if the media requirements of media list 114 are not currently loaded at media trays 120. Additionally or alternatively to steps 208-212, control system 106 may provide media list 114 to a print operator (e.g., via a display system not shown in FIG. 1). Using media list 114, the print operator may then load media trays 120 with media appropriate to print the job if the job is currently unavailable for printing. The print operator may then release the job for printing. Control system 106 may then de-spool the bitmap data from rip spool 116, and provide the bitmap data for the print job to print engine 118. Print engine 118 utilizes media loaded in media trays 120 to print the job. Generating media list 114 as part of the rasterization process allows the print job to be printed efficiently even though information about the proper media types for printing the job is missing or unknown. This makes the printing process at printer 102 more efficient.

EXAMPLE

Figure 3:
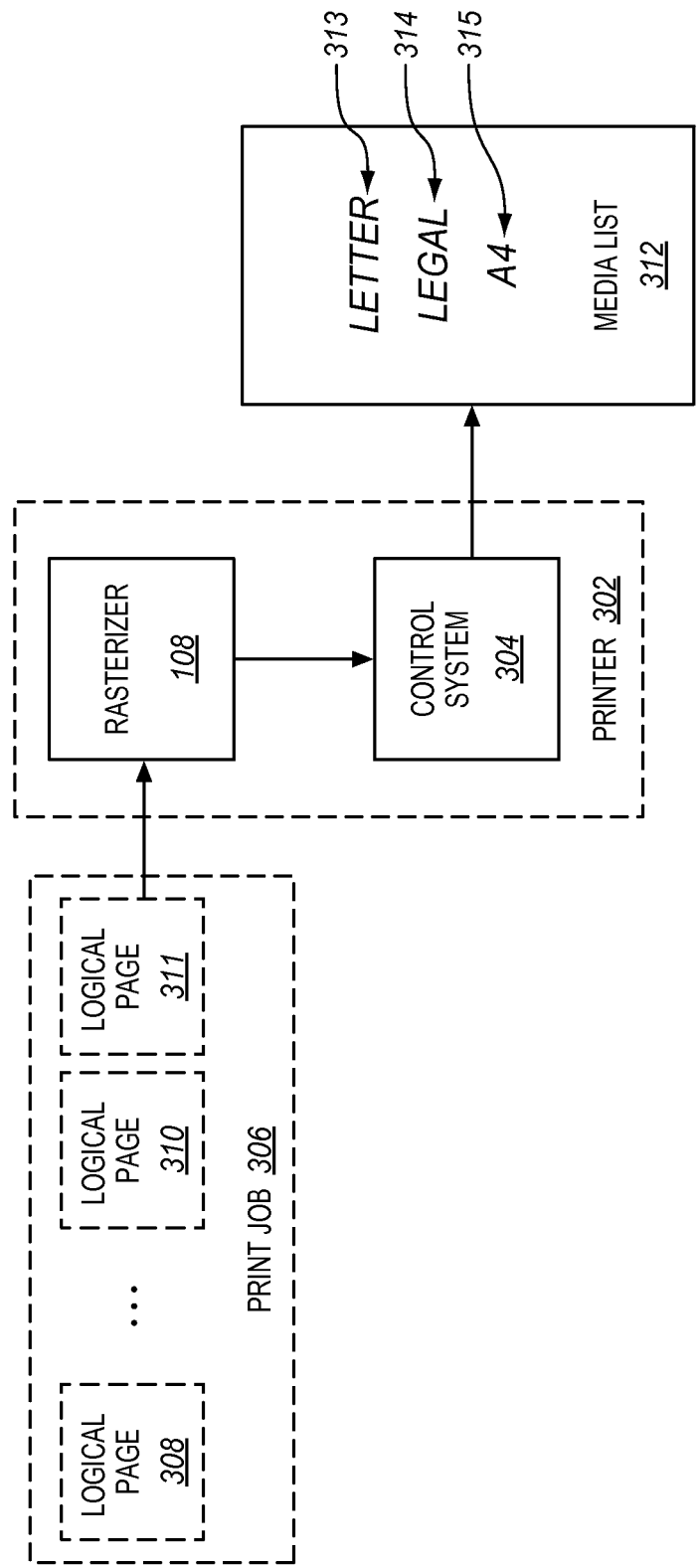
FIG. 3 is a block diagram of a printer in another exemplary embodiment.

FIG. 3 is a block diagram of another printer 302 in another exemplary embodiment. In the example, a print job 306 is generated with logical pages 308-311. In the example, print job 306 includes any number of logical pages that utilize a variety of different media types for printing. As rasterizer 108 generates bitmap data for logical pages 308-311, rasterizer 108 processes PDL data for print job 306, and determines the type of media for printing each of logical pages 308-310. As the media type for each of logical pages 308-311 is determined, rasterizer 108 indicates the type of media to control system 304. Thus, control system 304 may receive a stream of media type information from rasterizer 108 regarding each logical page 308-311. Using the stream of media type information, control system 304 generates a media list 312 of printable media that will be used for printing the print job. In the example, control system 304 generates media list 312 to specify letter 313, legal 314, and A4 315 media is used for the printing process for print job 306.

Figure 4:
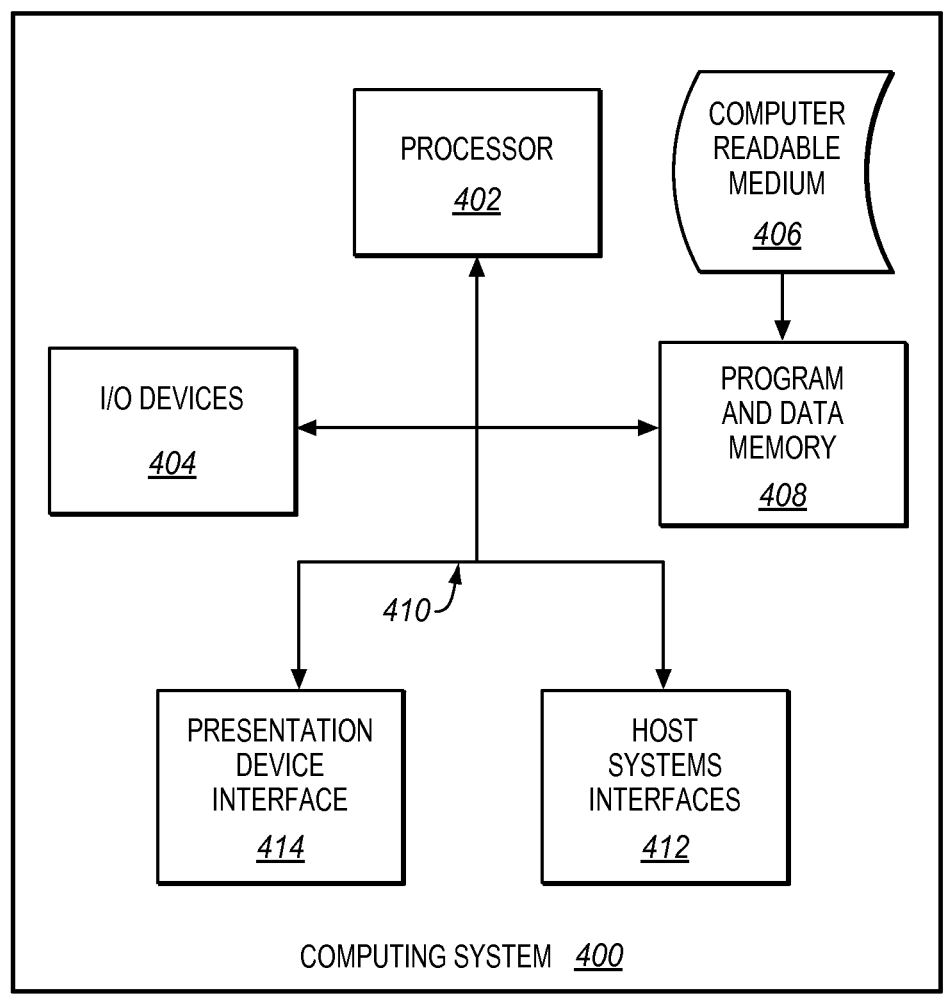
FIG. 4 illustrates a computing system in which a computer readable medium may provide instructions for performing the method of FIG. 2 in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 4 illustrates a computing system in which a computer readable medium may provide instructions for performing the method of FIG. 2 in an exemplary embodiment.

Furthermore, the invention can take the form of a computer program product accessible from a computer-usable or computer-readable medium 406 providing program code for use by or in connection with a computer or any instruction execution system. For the purposes of this description, a computer-usable or computer readable medium 406 can be any apparatus that can contain, store, communicate, or transport the program for use by or in connection with the instruction execution system, apparatus, or device.

The medium 406 can be an electronic, magnetic, optical, electromagnetic, infrared, or semiconductor system (or apparatus or device) or a propagation medium. Examples of a computer-readable medium 406 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution.

Input/output or I/O devices 404 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 412, or remote printers or storage devices through intervening private or public networks. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A print controller comprising:
a control system that is operable to receive raw print data for a print job; and
a rasterizer that is operable to identify a type of media for the job by rasterizing Page Description Language (PDL) data within the raw print data,
wherein the rasterizer is further operable to determine a priority value for the type of media, to identify a default type of media assigned to the print controller, to determine a priority value for the default type of media assigned to the print controller, and to generate raster data for the job based on the type of media having a highest priority value,
wherein the rasterizer is further operable to store the rasterized print data in a RIP spool before a printer initiates printing for the print job, and to indicate the type of media having the highest priority value to the control system;
the control system is further operable, before the printer initiates printing for the print job: to indicate that the job is unavailable if the type of media having the highest priority value is missing from a tray of the printer, to await input indicating that the missing type of media has been loaded, and to de-spool the rasterized print data from the RIP spool in response to receiving the input, enabling the printer to initiate printing for the print job.

2. The print controller of claim 1 wherein:
the rasterizer is further operable to identify a type of media for printing each logical page of the print job, and to indicate the type of media for printing each logical page to the control system; and
the control system is further operable to generate a list of printable media based on the types of media identified by the rasterizer, to determine if the type of media for printing a logical page is represented in the list of printable media, and to add the type of media to the list of printable media if the type of media is not represented.

3. The print controller of claim 1 wherein:
the default type of media is defined by a size and a weight.

4. The print controller of claim 1 wherein:
the rasterizer is further operable to determine whether the PDL does not specify a type of media for printing the print job, and responsive to the PDL not specifying the type of media, the rasterizer is further operable to identify a type of media that will be utilized for printing the print job based on media properties defined in the PDL.

5. The print controller of claim 1 wherein:
the default type of media is defined by a finish applied to a surface of the media.

6. The print controller of claim 1 wherein:
the control system is further operable to generate a virtually stored media that specifies a media property utilized for rasterizing the print job, and to instruct the rasterizer to rasterize the print job based on a media property specified in the virtually stored media.

7. The print controller of claim 1 wherein:
the control system is further operable to indicate the print job as available for printing responsive to determining that the type of media having the highest priority value is available at a tray of the printer.

8. The print controller of claim 1 wherein:
the control system is further operable to pre-process the print job to determine that a print order of logical pages in the print job is non-sequential, and to initiate rasterization despite the print order being non-sequential.

9. A method comprising:
receiving raw print data for a print job;
identifying a type of media for the job by rasterizing Page Description Language (PDL) data within the raw print data;
determining a priority value for the type of media;
identifying a default type of media assigned to the print controller;
determining a priority value for the default type of media assigned to the print controller; and
generating raster data for the job based on the type of media having a highest priority value,
storing the rasterized print data in a RIP spool before a printer initiates printing for the print job; and
before the printer initiates printing for the print job:
indicating that the job is unavailable if the type of media having the highest priority value is missing from a tray of the printer;
awaiting input indicating that the missing type of media has been loaded; and
de-spooling the rasterized print data from the RIP spool in response to receiving the input, enabling the printer to initiate printing for the print job.

10. The method of claim 9 further comprising:
identifying a type of media for printing each logical page of the print job.

11. The method of claim 9 wherein:
the default type of media is defined by a size and a weight.

12. The method of claim 9 further comprising:
determining if the PDL does not specify a type of media for printing the print job; and
identifying a type of media that will be utilized for printing the print job based on media properties defined in the PDL if the PDL does not specify the type of media.

13. The method of claim 9 wherein:
the default type of media is defined by a finish applied to a surface of the media.

14. The method of claim 9 further comprising:
determining if one of the identified types of media is available in a physical tray of the printer;
generating a virtually stored media that specifies a media property utilized for rasterizing the print job; and
rasterizing the print job based on media property specified in the virtually stored media if the one of the identified types of media is not available.

15. A non-transitory computer readable medium embodying programmed instruction which, when executed by a processor, are operable for performing a method, the method comprising:
receiving raw print data for a print job;
identifying a type of media for the job by rasterizing Page Description Language (PDL) data within the raw print data;
determining a priority value for the type of media;
identifying a default type of media assigned to the print controller;
determining a priority value for the default type of media assigned to the print controller; and
generating raster data for the job based on the type of media having a highest priority value,
storing the rasterized print data in a RIP spool before a printer initiates printing for the print job; and
before the printer initiates printing for the print job:
indicating that the job is unavailable if the type of media having the highest priority value is missing from a tray of the printer;
awaiting input indicating that the missing type of media has been loaded; and
de-spooling the rasterized print data from the RIP spool in response to receiving the input, enabling the printer to initiate printing for the print job.

16. The non-transitory medium of claim 15 further comprising:
identifying a type of media for printing each logical page of the print job.

17. The non-transitory medium of claim 15 wherein:
the default type of media is defined by a size and a weight.

18. The non-transitory medium of claim 15 wherein the method further comprises:
determining if the PDL does not specify a type of media for printing the print job; and
identifying a type of media that will be utilized for printing the print job based on media properties defined in the PDL if the PDL does not specify the type of media.

19. The non-transitory medium of claim 15 wherein the method further comprises:
determining a first priority value for a type of media specified in the PDL; and
determining a second priority value for a default type of media assigned to the print controller; and wherein identifying the type of media further comprises:
  identifying the type of media having a highest priority value.

20. The non-transitory medium of claim 15 wherein the method further comprises:
  determining if one of the identified types of media is available in a physical tray of the printer;
  generating a virtually stored media that specifies a media property utilized for rasterizing the print job; and
  rasterizing the print job based on media property specified in the virtually stored media if the one of the identified types of media is not available.

* * * * *